United States Patent [19]

Andrascheck et al.

[11] 4,082,711

[45] Apr. 4, 1978

[54] SHAPED ARTICLES ON THE BASIS OF VINYL CHLORIDE POLYMERS HAVING AN INCREASED WHITE FRACTURE EFFECT

[75] Inventors: Hans-Joachim Andrascheck, Burgkirchen, Alz; Otfried Lörcher, Burghausen, Salzach; Erich Zentner, Burgkirchen, Alz, all of Germany

[73] Assignee: Hoechst Aktiengesellschaft, Frankfurt am Main, Germany

[21] Appl. No.: 733,760

[22] Filed: Oct. 19, 1976

[30] Foreign Application Priority Data

Oct. 24, 1975 Germany .............................. 2547612

[51] Int. Cl.$^2$ ...................... B29C 17/00; B31F 23/10; C08K 5/10; C08K 5/53
[52] U.S. Cl. ............................ 260/23 X A; 156/219; 156/220; 260/31.8 M; 260/31.8 DR; 260/31.8G; 264/293; 264/320; 428/913
[58] Field of Search ............... 428/913; 264/320, 293; 156/219, 220; 260/23 XA, 31.8 M, 31.8 DR, 31.8 G

[56] References Cited

U.S. PATENT DOCUMENTS

| | | | |
|---|---|---|---|
| 2,925,625 | 2/1960 | Souza | 264/320 |
| 3,061,572 | 10/1962 | Packer | 260/31.4 R |
| 3,310,619 | 3/1967 | Slosberg | 264/293 |
| 3,340,135 | 9/1967 | Avery | 428/913 |
| 3,468,744 | 9/1969 | Reinhart | 428/913 |
| 3,697,349 | 10/1972 | Andraschek et al. | 264/293 |
| 3,925,272 | 12/1975 | Ibata et al. | 260/31.8 D |

FOREIGN PATENT DOCUMENTS 719,193  10/1965  Canada ................................. 264/320

*Primary Examiner*—Ronald W. Griffin
*Attorney, Agent, or Firm*—Connolly and Hutz

[57] ABSTRACT

The present invention provides a process for the manufacture of shaped articles, especially films and sheets, having an increased white fracture effect. These articles are obtained with the use of molding compositions on the basis of vinyl chloride polymers containing from 5 to 25% by weight of elastomers and from 3 to 10% by weight of plasticizers, each relative to the total mixture.

8 Claims, No Drawings

SHAPED ARTICLES ON THE BASIS OF VINYL CHLORIDE POLYMERS HAVING AN INCREASED WHITE FRACTURE EFFECT

The shaped articles in accordance with the invention are superior to known white fracture sheets, which is proved by higher contrast values and higher white fracture radius. It is known that elastomers increase the impact strength of vinyl chloride polymers, and that blends of such elastomers, for example acrylonitrile/-butadiene/styrene (ABS), methylmethacrylate/-butadiene/styrene (MBS) or methylmethacrylate/acrylonitrile/butadiene/styrene (MABS) resins with vinyl chloride polymers, containing up to 20% by weight of elastomer component relative to the total mixture give sheets having a more or less (depending on the polymer compound) white fracture effect (see Plaste und Kautschuk 1972, 4, pp 255 to 259). The cause of white fracture of such sheets where the elastomer component is present in the vinyl chloride polymer (hard phase) as disperse phase (elastic phase) and the particle diameter of the latter is at least 0.01 $\mu$m is not fully determined as yet. The general assumption is that white fracture is caused by formation of defective spots (micro-fissures, crazes) in the sheet resulting from a deformation (= elongation) of the sheet beyond the yield point (such deformations occur for example on application of characters by stamping) and by alteration of the double refraction of light at these defective places (see the above paper, p. 256, right column and p. 258, left column).

However, the contrast due to white fracture exhibited after unintentional deformation by sheets on the basis of the above molding compositions of vinyl chloride polymers and elastomers is not sufficient in the case where these sheets are to be used, for example, for bearing characters stamped on. This kind of application requires the white fracture to be considerably more conspicuous and contrasting.

It is known from U.S. Patent No. 2,925,625 that molding compositions containing vinyl chloride polymers, stabilizers, lubricants, dyestuffs and an inorganic additive or a plasticizer incompatible with vinyl chloride polymers (extender plasticizer) may be processed to shaped articles, for example calendered or extruded to sheets, which show white fracture. The disadvantage of this process, however, resides in the fact that the inorganic additives or incompatible plasticizers necessary for the formation of white fracture render turbid the sheets, thus reducing the contrast of the white fracture. Moreover, these sheets are of poor flexibility.

Furthermore, German Patent Specification No. 1,804,049 discloses the use of special emulsion graft copolymers of vinyl chloride on a copolymer of butadiene, styrene and acrylates or methacrylates for the manufacture of plasticizer-free flexible sheets having a white fracture effect (white fracture sheets). However, the white fracture obtained on these sheets by stamping does not sufficiently meet the requirements with respect to a good contrast value.

Surprisingly, it has now been found that the white fracture effect of shaped articles manufactured from molding compositions on the basis of vinyl chloride polymers can be considerably increased by using plasticizers being compatible with polyvinyl chloride (PVC), so that it is superior to that of known white fracture sheets.

The present invention therefore provides a process for the manufacture of shaped articles, especially films or sheets, having an increased white fracture effect, which comprises using molding compositions on the basis of vinyl chloride polymers containing from 5 to 25% by weight of elastomers and from 3 to 10% by weight of plasticizers, each relative to the total mixture.

It is not possible to give a precise physical explanation for the unexpectedly high degree of white fracture displayed by the molding compositions in accordance with this invention, but is supposed that the plasticizer used in amounts according to the invention in the blends of vinyl chloride polymers and elastomers having already white fracture properties brings about a synergistic effect which results in a considerable increase of white fracture.

The plasticizers to be used in accordance with this invention are those which are compatible with PVC. As is known, primary and secondary plasticizers for PVC belong to this group of plasticizers which are compatible with PVC even in amounts superior to those to be used in accordance with this invention, and which do not exudate from the corresponding shaped articles, while extender plasticizers do not belong to this group. All three plasticizer types are described for example in KunststoffRundschau 6, 1972, pp. 251-260.

Thus, in accordance with this invention, there are used in principle the primary and secondary plasticizers known for PVC, as they are described for example in the above paper or in Helmut Kainer, Polyvinylchlorid und Vinylchlorid-Mischpolymerisate, Berlin, Heidelberg, New York 1965, pp. 259–319.

Examples of the great number of plasticizers to be used in accordance with the invention are those selected from the group of phosphoric, phthalic, di- and tricarboxylic, fatty or sulfonic acid esters and of epoxidized oils. Advantageous are esters of phosphoric, phthalic, adipic, azelaic or sebacic acid, of oleic or ricinoleic acid; the alcohol component being an aliphatic monohydric alcohol or polyol having from 1 to 20, preferably 1 to 10, carbon atoms, or an aromatic alcohol, preferably phenol or cresol; furthermore alkylsulfonic acid esters of phenol or cresol, alkyl being a hydrocarbon radical having from 8 to 25 carbon atoms; or epoxidized soybean oil. Especially suitable plasticizers are tricresylphosphate, tri-2-ethylhexylphosphate, dibutylphthalate, di-2-ethylhexylphthalate, dicyclohexylphthalate, di-2-ethylhexyladipate, di-2-ethylhexylazelate, di-2-ethylhexylsebacate, glycerol monooleate, glycerol dioleate, glycerol monoricinoleate or epoxidized soybean oil having an iodine number of from 6 to 10. A mixture of two or several of suitable plasticizers, preferably a blend of epoxidized soybean oil having an iodine number of from 6 to 10 and glycerol monooleate in a weight ratio of 2:1, may also be used.

The amount of plasticizer to be used in accordance with this invention is from 3 to 10% by weight, preferably from 3 to 8 % by weight, relative to the total mixture.

As already mentioned before, numerous elastomers which are usually employed for modifying the impact strength of vinyl chloride polymers and which are present in the vinyl chloride polymer in the form of dispersedly distributed particles having a diameter of at least 0.01 $\mu$m bring about a more or less distinct white fracture effect. According to this invention, all those elastomers are in priciple suitable the particle size (particle diameter) of which in the elastic phase is greater than 0.01 μm, preferably from 0.1 to 10 μm, and especially from 0.1 to 1 μm. Preferably, elastomers of acrylonitrile/butadiene/styrene, methylmethacrylate/-butadiene/styrene or methylmethacrylate/acrylonitrile/butadiene/styrene, each having a butadiene content of at least 35% by weight relative to the total polymer, the particle size in the elastic phase of which being from 0.1 to 10 μm, preferably 0.1 to 1 μm, are used. Particularly suitable are ABS polymers the butadiene content of which is from 40 to 70% by weight, the styrene content of which is from 20 to 40% by weight and the acrylonitrile content of which is from 10 to 25% by weight, each relative to the total polymer; MBS polymers the content of which of butadiene is from 35 to 45% by weight; of styrene from 10 to 20% by weight and of methylmethacrylate from 40 to 60% by weight, each relative to the total polymer; or MABS polymers containing from 40 to 60% by weight of butadiene, from 25 to 35% by weight of styrene, from 15 to 30% by weight of methylmethacrylate and less than 10% by weight of acrylonitrile, each relative to the total polymer.

The elastomers in question are advantageously prepared in aqueous emulsion according to the known two-step graft polymerization process.

The amount of elastomer(s) in the molding compositions according to this invention is from 5 to 25% by weight, preferably from 10 to 18% by weight, relative to the total mixture.

By vinyl chloride polymers, there are to be understood one or more vinyl chloride homo- and copolymers or graft polymers having a content of at least 50% by weight, preferably 75% by weight, and especially 85% by weight of polymerizable vinyl chloride, relative to the total polymer.

The following monomers are suitable, for example, for being copolymerized with vinyl chloride: olefins such as ethylene or propylene, vinyl esters of straight-chain or branched carboxylic acids having from 2 to 20, preferably from 2 to 4 carbon atoms, such as vinyl acetate, vinyl propionate, vinyl butyrate, vinyl-2-ethylenehexoate, vinylstearate; vinyl halides, such as vinyl fluoride, vinylidene fluoride, vinylidene chloride; vinyl esters, unsaturated acids, such as maleic acid, fumaric acid, acrylic acid, methacrylic acid and their monoesters or diesters with monoalcohols or dialcohols having from 1 to 10 carbon atoms; acrylonitrile, styrene, and cyclohexyl maleimide.

For carrying out graft polymerization there may be used, for example, elastomeric polymers which have been obtained by polymerizing one or more of the following monomers: dienes, such as butadiene and cyclopentadiene; olefins, such as ethylene, propylene; styrene, unsaturated acids, such as acrylic acid or methacrylic acid, as well as their esters with monoalcohols or dialcohols having from 1 to 10 carbon atoms, acrylonitrile, vinyl compounds, such as vinyl esters of saturated or branched carboxylic acid having from 2 to 20, preferably from 2 to 4 carbon atoms.

Preferred vinyl chloride polymers are homopolymers of vinyl chloride, copolymers having a content of at least 85% by weight of polymerized vinyl chloride or graft copolymers of vinyl chloride containing at least 85% by weight of polymerized vinyl chloride; the co-polymer upon which the vinyl chloride is grafted consisting of butadiene, isoprene or higher conjugated dienes and acrylonitrile, styrene, butyl acrylate or methylmethacrylate, preferably of butadiene and acrylonitrile, in a weight ratio of 90 : 10.

The K values (according to German Industrial Standard DIN 53 726) of the vinyl chloride homo-, co- or graft polymers are advantageously from 54 to 70, preferably from 57 to 65.

The mixtures of vinyl chloride polymers, elastomers and plasticizers according to this invention contain advantageously the processing auxiliaries usual in vinyl chloride polymer processing, for example heat and light stabilizers, lubricants and flow auxiliaries (processing aids), and special additives such as antistatic substances.

Suitable heat and light stabilizers are, for example, monoalkyl tin compounds and dialkyl tin compounds, the alkyl radicals having from 1 to 10 carbon atoms, the remaining valencies of the tin contained in these compounds being bound with further substituents by means of oxygen and/or sulfur atoms; aminocrotonic acid esters: $\alpha$-phenylindole; salts of alkaline earth metals and of zinc, barium, cadmium or lead with aliphatic carboxylic acids or oxycarboxylic acids, with optionally alkylated aromatic hydroxy compounds; basic or neutral lead salts or inorganic acids such as sulfuric, phosphoric or phosphorous acid.

Organo-tin/sulfur stabilizers such as dimethyl-tin-bis-2-ethyl-hexyl-thioglycolate, di-n-butyl-tin-bis-2-ethylhexylthioglycolate, or di-n-octyl-tin-bis-2-ethylhexylthioglycolate are preferred.

The stabilizers are employed in quantities of from 0.2 to 3 weight %, calculated on the total mixture; they may be used as mixtures with each other and with antioxidants, such as alkyl-substituted hydroxyl compounds, for example ditertiary butyl paracresol, dibutyl-hydroxy-naphthalene, tertiary butylhydroxy anisole, and organo-phosphorous acid esters, e.g. tris-(mono- or di-) nonylphenyl-phosphite. The light stability may be improved by adding to the mixtures UV-light absorbing substances, such as derivatives of benzophenone or benzotriazole, e.g. 2-(2'hydroxy-5'-methylphenyl)benzotriazole or 2-(2'-hydroxy-3'-tertiary butyl-5'-methylphenyl)-5-chloro-benzotriazole.

As lubricants there may be used, for example, one or more higher aliphatic carboxylic acids or hydroxycarboxylic acids, as well as their alkalimetal or alkaline earth metal salts, their esters and amides, such as stearic acid, montanic acid, glycerol monooleate, bis-stearyl- or bis-palmitoyl-ethylene diamine, montanic acid ester of ethanediol or 1,3-butanediol. An especially suitable lubricant is a mixture of stearic acid and bis-stearoyl-ethylene diamine in a weight ratio of 1 : 5.

The amount of lubricant in the molding compositions is from 0.1 to 2% by weight, preferably from 0.5 to 1% by weight, relative to the total mixture.

As antistatic additives there may be used for example the quaternary ammonium salts usual for vinyl chloride polymers.

Processing of the molding compositions in accordance with this invention is carried out according to the methods knwon for vinyl chloride polymers. When sheets are manufactured, the individual components are thoroughly mixed in a usual blending apparatus, for example a high-speed mixer, and processed to a sheet on an extruder or calender at operating temperatures of from 170° to 220° C; the thickness of the sheet being advantageously from 70 to 500 μm, preferably from 100 to 250 μm. Calendering of the mixture pregelled for example in a kneader or roll mill is preferably carried out on a four- or five-roll calender according to the high temperature process; the temperature being from 190° to 210° C and the sheet being cooled after having left the last calender roll by means of cooling cylinders.

The shaped articles obtainable according to this invention, especially films or sheets, are distinguished by a substantially increased white fracture on application of, for example, characters or figures by stamping, as compared to known sheets. This increased white fracture clearly manifests itself by those improved properties of the sheet which are characteristic in this respect, that is, a high contrast value and white fracture radius, furthermore, a high light reflection and low transparency of a sheet subjected to a 100% elongation.

The following examples and comparative examples illustrate the invention.

The components indicated in the examples are mixed in a usual highspeed mixer, pregelled in a kneader at a temperature of about 140° C and processed on a four-roll calender the rolls of which (in direction of the travelling sheet) are heated at 190°, 195°, 200° and 210° C, respectively, to form sheets having an identical thickness of 200 μm each.

The contrast value, the white fracture radius, the light reflection and transparency of a sheet subjected to a 100% elongation are measured on these sheets. The properties are determined according to the following methods:

1. Contrast value: Strips having a width of from 10 to 20 mm and a length of about 250 mm are cut from the sheets in transversal direction to that of calendering. The individual strips are coated on one side with a black lacquer (for example Flexoschwarz 85 EG 118-1 of Messrs. Gebr. Schmidt GmbH, Frankfurt, West Germany) and, after drying of the lacquer coating, stamped in the same manner in all cases with letters or figures having a height of 13 and 4.5 mm, respectively, by means of the commercial stamping device Dymo Mite Tapewriter ® of Dymo Industries Inc., Berkely, Calif., U.S.A. . The contrast value is determined by visual inspection of the stamped strips and comparison of the white fracture of the stamps. The results are given the classification of 0, 1, 2, 3 and 4; the classification 0 meaning that the strip (sheet) has no white fracture and the calssification 4 meaning that it has a very heavy white fracture.

2. White fracture radius: Strips having a width of 15 mm and a length of 250 mm are cut from the sheets in transversal direction to that of calendering. These strips are bent to form a loop and pulled, the end of the loop ahead, through a slot having an inner width of 0.650 mm. The slot is formed by 2 circular wires having a length of 17 mm and a diameter of 2 mm the ends of which are attached in parallel position to each other. When the loop is pulled through the slot, the radius of the loop is constantly narrowed: that radius in mm is measured as white fracture radius where white fracture occurs on pullingthrough of the loop (the radius may be measured using a slide gage, a feeler gage or optical means).

3. Light reflection after 100% elongation: According to German Industrial Standard DIN 53 455, test specimens of the sheets are subjected to a 100% maintained elongation. Subsequently, the light reflection is measured according to German Industrial Standard DIN 5033 by means of the Elrepho apparatus of Messrs. Zeiss, using a color measuring filter FMY/C (corresponding to the reference standard DIN 5033).

4. Transparency after 100% elongation: According to DIN 53 455, test specimens of the sheets are subjected to a 100% maintained elongation. Subsequently, the transparency is measured by means of the spectrophotometer DM R 21 of Messrs. Zeiss in combination with the Ulbricht ball (the Ulbricht ball is described for example in G. Kortum, Kolorimetrie und Spektralfotometrie, vol. II, 4th ed., 1962, p. 221).

EXAMPLE 1

(Comparative Example = Example 1 of German Patent Specification No. 1,804,049)

97.5 weight % of PVC emulsion graft polymer having a K value of 70, containing 21 weight % (relative to VC) of an elastomeric emulsion copolymer containing 52 weight % of butadiene, 31 weight % of styrene, and 17 weight % of methylmethacrylate, the latter compound being added at a conversion rate of 80% of the monomer vinyl chloride, 0.5 weight % of diphenylthio-urea 2.0 weight % of montan wax (1,3-butanediol-montanic acid ester)

EXAMPLE 2

93.0 weight % of VC homopolymer, prepared according to the mass polymerization process, K value 60, 5.0 weight % of di-2-ethylhexylphthalate (dioctylphthalate)

1.4 weight % of di-n-octyl -tin-bis-(2-ethylhexylthioglycolate)

0.5 weight % of bis-stearoylethylene diamine 0.1 weight % of stearic acid.

EXAMPLES 3 through 8

In a test series using mixtures of X weight % of mass PVC (K value 60), Y weight % of dioctylphthalate, 15 weight % of elastomer consisting of 49 weight % of methylmethacrylate, 37 weight % of butadiene and 14 weight % of styrene, 1.4 weight % of organo-tin stabilizer, 0.5 weight % of bis-stearoylethylene diamine and 0.1 weight % of stearic acid, the PVC to dioctylphthalate ratio (X : Y) is constantly changed.

| Examples 3 to 8 | wt. % PVC | wt. % di-2-ethylhexylphthalate |
| --- | --- | --- |
| Example 3 (Comparative Example) | 83 | 0 |
| Example 4 (Comparative Example) | 81.5 | 1.5 |
| Example 5 (acc. to inv.) | 80 | 3 |
| Example 6 (acc. to inv.) | 78 | 5 |
| Example 7 (acc. to inv.) | 75 | 8 |
| Example 8 (Comparative Example) | 71 | 12 |

EXAMPLES 9 through 13

In a further test series using mixtures of X weight % of suspension PVC (K value 60), Y weight % of epoxidized soybean oil having an iodine number of 6, 15 weight % of elastomer containing 14 weight % of acrylonitrile, 63 weight % of butadiene and 23 weight % of styrene, 1.4 weight % of organo-tin stabilizer, 1 weight % of copolymer containing 45 weight % of methylmethacrylate and 55 weight % of styrene, 0.5 weight % of bis-stearoyl-ethylene diamine and 0.1 weight % of stearic acid, the PVC to dioctylphthalate (X : Y) ratio is changed.

| Examples 9 to 13 | wt. % PVC | wt. % epoxid.soybean oil |
|---|---|---|
| Example 9 (Comparative Example) | 82 | 0 |
| Example 10 (Comparative Example) | 80.5 | 1.5 |
| Example 11 (acc. to inv.) | 79 | 3 |
| Example 12 (acc. to inv.) | 77 | 5 |
| Example 13 (acc. to inv.) | 74 | 8 |

EXAMPLE 14

79.5 weight % VC-homopolymer, prepared according to the suspension polymerization process, K value 60, 10.0 weight % elastomer of 19 weight % acrylonitrile, 55 weight % butadiene and 26 weight % styrene, 8.0 weight % di-2-ethylhexyladipate, 1.5 weight % di-n-octyl-tin-bis-(2-ethylhexylthioglycolate), 0.5 weight % calcium stearate, 0.5 weight % copolymer of 55 weight % styrene and 45 weight % methylmethacrylate.

EXAMPLE 15

76.5 weight % VC-homopolymer, prepared according to the mass polymerization process, K value 60, 18.0 weight % elastomer of 18 weight % acrylonitrile, 43 weight % butadiene, 39 weight % styrene, 2.0 weight % epoxidized soybean oil having an iodine number of 6, 1.0 weight % glycerol-monooleate, 1.5 weight % di-n-octyl-tin-bis-(2-ethylhexylthioglycolate), 0.5 weight % calcium stearate, 0.5 weight % copolymer of 55 weight % styrene and 45 weight % methylmethacrylate.

The results are listed in the following Table. The Table shows that the sheets manufactured from molding compositions in accordance with this invention are superior as to their properties characteristic for white fracture to sheets obtained from known molding compositions. Thus, the sheets in accordance with the invention have a considerably increased contrast value which is important for an evaluation of the white fracture of sheets in the practice, since it is a direct indication of the sharpness and clearness of stamped characters.

Table

| Examples | contrast value (classif. 0 to 4) | white fracture radius (mm) | light reflection (%) | transparency (%) |
|---|---|---|---|---|
| Comp. Ex. | | | | |
| 1 | 3 | 1.75 | — | — |
| 2 | 0 | 0 | 12 | 95 |
| 3 | 2 | 1.5 | 20 | 80 |
| 4 | 2 | 2.0 | 28 | 69 |
| 8 | 1 | 1 | 16 | 87 |
| 9 | 2 | 1.5 | 22 | 78 |
| 10 | 2 | 1.75 | 31 | 68 |
| Ex. acc. to inv. | | | | |
| 5 | 3 | 2.75 | 66 | 36 |
| 6 | 3 | 3.25 | 78 | 21 |
| 7 | 4 | 3.25 | 85 | 19 |
| 11 | 3 | 2.25 | 61 | 41 |
| 12 | 4 | 2.75 | 82 | 23 |
| 13 | 4 | 3.25 | 86 | 19 |
| 14 | 3 | 2.5 | 64 | 38 |
| 15 | 3 | 2.25 | 69 | 32 |

We claim:

1. In the process for the manufacture of shaped articles, especially films or sheets, with a white fracture effect from a molding composition of
   (a) a vinyl chloride polymer having at least 50% polymerized vinyl chloride by weight of the total polymer, and
   (b) an elastomer of a acrylonitrile/butadiene/styrene, methylmethacrylate/butadiene/styrene or methylmethacrylate/acrylonitrile/butadiene/styrene resin in an amount of from 5 to 25% by weight of the total molding composition, the improvement which comprises adding as plasticizer to said molding composition a phosphoric, phtalic, di- or tricarboxylic, fatty or alkylsulfonic acid ester or an epoxidized oil in an amount of from 3 to 10% by weight of the total molding composition.

2. The process as claimed in claim 1, wherein the plasticizer is epoxidized soybean oil, an ester of phosphoric, phtalic, adipic, azelaic, sebacic, oleic or ricioleic acid wherein the alcohol component is an aliphatic monohydric alcohol or a polyol having from 1 to 10 carbons, or phenol or cresol, or an alkylsulfonic acid ester of phenol or cresol, said alkyl having from 8 to 25 carbons.

3. The process as claimed in claim 1, wherein as plasticizer tricresylphosphate, tri-2-ethylhexylphosphate, dibutylphthalate, di-2-ethylhexylphthalate, dicyclohexylphthalate, di-2-ethylhexyladipate, di-2-ethylhexylazelate, di-2-ethylhexylsebacate, glycerol monooleate, glycerol dioleate or epoxidized soybean oil having an iodine number of from 6 to 10 is used.

4. The process as claimed in claim 1, wherein as plasticizer a mixture of epoxidized soybean oil having an iodine number of from 6 to 10 and glycerol monooleate in a weight ratio of 2 : 1 is used.

5. The process as claimed in claim 1, wherein as elastomers those selected from the group of acrylonitrile/butadiene/styrene polymers containing from 40 to 70% by weight of butadiene, from 20 to 40% by weight of styrene and from 10 to 25% by weight of acrylonitrile; from the group of methylmethacrylate/butadiene/styrene polymers containing from 35 to 45% by weight of butadiene, from 10 to 20% by weight of styrene and from 40 to 60% by weight of methylmethacrylate, or from the group of methylmethacrylate/acrylonitrile/butadiene/styrene polymers containing from 40 to 60% by weight of butadiene, from 25 to 35% by weight of styrene, from 15 to 30% by weight of methylmethacrylate and less than 10% by weight of acrylonitrile, are used.

6. The process as claimed in claim 1, wherein as vinyl chloride polymer a vinyl chloride homopolymer, a vinyl chloride copolymer or a vinyl chloride graft copolymer having at least 85% by weight of polymerized vinyl chloride relative to the total polymer is used.

7. The process as claimed in claim 1, wherein the amount of plasticizer is from 3 to 8% by weight.

8. The process as claimed in claim 1, wherein the amount of elastomers is from 10 to 18% by weight.

* * * * *